United States Patent
Arasuna et al.

(10) Patent No.: US 10,144,363 B2
(45) Date of Patent: Dec. 4, 2018

(54) MOUNTING ASSEMBLY OF VEHICULAR UTILITY PART MOUNTING MEMBER AND VEHICULAR INTERIOR PART

(71) Applicant: TOYOTA BOSHOKU KABUSHIKI KAISHA, Aichi (JP)

(72) Inventors: Takashi Arasuna, Nagoya (JP); Yusaku Yoshida, Toyota (JP); Yoshihito Suzuki, Seto (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/919,650

(22) Filed: Mar. 13, 2018

(65) Prior Publication Data

US 2018/0281695 A1 Oct. 4, 2018

(30) Foreign Application Priority Data

Mar. 30, 2017 (JP) .................. 2017-067278

(51) Int. Cl.
*B60R 11/02* (2006.01)
*H04R 1/02* (2006.01)
*B60R 11/00* (2006.01)

(52) U.S. Cl.
CPC ............ *B60R 11/0247* (2013.01); *H04R 1/02* (2013.01); *B60R 2011/0028* (2013.01); *B60R 2011/0047* (2013.01); *H04R 2201/021* (2013.01)

(58) Field of Classification Search
CPC ......... B60R 11/0247; B60R 2011/0047; B60R 2011/0028; H04R 1/02; H04R 2201/021
See application file for complete search history.

(56) References Cited

U.S. PATENT DOCUMENTS

| 7,195,232 | B2* | 3/2007 | Marshall | A47K 3/003 16/438 |
| 8,979,171 | B2* | 3/2015 | Usami | B60R 13/0243 296/153 |
| 9,452,727 | B2* | 9/2016 | Hase | B60R 21/0428 |
| 2012/0286115 | A1* | 11/2012 | Hirano | B60J 1/2063 248/221.11 |
| 2013/0147172 | A1* | 6/2013 | Hirose | B60R 21/055 280/751 |

(Continued)

FOREIGN PATENT DOCUMENTS

JP 2009-264564 11/2009

*Primary Examiner* — Mohammad Islam
(74) *Attorney, Agent, or Firm* — Greenblum & Bernstein P.L.C.

(57) ABSTRACT

In a mounting assembly of a vehicular utility part mounting member and a vehicular interior part, the vehicular utility part mounting member includes first and second walls extending from a cover member to be opposite each other and configured to have a vehicular utility part therebetween, an extended wall including first and second extended portions extending from extended distal end portions of the first and second walls to an outside of the cover member and parallel to the cover member, and a connection portion connecting end portions of the first and second extended portions that are outside the cover member. The vehicular utility part arranged in a space inside the extended wall has an exposed portion that is disposed outside the cover member and the exposed portion overlaps an insertion hole edge of the insertion hole of the vehicular interior part.

12 Claims, 8 Drawing Sheets

(56) References Cited

U.S. PATENT DOCUMENTS

| | | | |
|---|---|---|---|
| 2013/0234461 A1* | 9/2013 | Coakley | B60R 9/058 296/1.08 |
| 2014/0306522 A1* | 10/2014 | Nagayasu | B60R 16/0215 307/10.1 |
| 2014/0312664 A1* | 10/2014 | Tanabe | B60R 21/207 297/216.13 |
| 2016/0001714 A1* | 1/2016 | Migaki | B60R 13/0237 296/193.05 |

* cited by examiner

MOUNTING ASSEMBLY OF VEHICULAR UTILITY PART MOUNTING MEMBER AND VEHICULAR INTERIOR PART

CROSS REFERENCE TO RELATED APPLICATION

This application claims priority from Japanese Patent Application No. 2017-67278 filed on Mar. 30, 2017. The entire contents of the priority application are incorporated herein by reference.

FIELD OF THE INVENTION

The present disclosure relates to a mounting assembly of a vehicular utility part mounting member and a vehicular interior part.

BACKGROUND

A part mounting device for mounting a vehicular utility part in a receiving member such as a ceiling member has been known. Such a part mounting device includes a cover member, a part housing portion included in the cover member, and legs arranged around the part housing portion. The part housing portion is configured such that a part is arranged directly on a rear surface of the cover member.

When the part mounting device is mounted in the receiving member, the legs and the part housing portion are inserted in a through hole of the receiving member while the legs being elastically deformed and projections of the legs are fit on a hole edge of the through hole. Thus, the part mounting device is mounted in the receiving member.

The part housing portion and the legs arranged around the part housing portion that are included on the rear surface of the cover member are necessary to be inserted in the through hole to mount the part mounting device in the receiving member. Therefore, a size of the through hole is increased and accordingly, a size of the cover member disposed to cover the through hole is also increased. The size of the cover member that is disposed on a vehicular interior side surface of the receiving member is increased. This may deteriorate an appearance of an interior of a vehicle.

SUMMARY OF THE INVENTION

An objective of the present technology is to provide a mounting assembly of a vehicular utility part mounting member and a vehicular interior part that improves a design of a vehicular interior and in which the vehicular utility part can be surely and stably mounted in the vehicular interior part.

According to the present technology, in a mounting assembly of a vehicular utility part mounting member and a vehicular interior part, the vehicular utility part mounting member includes a cover member having a front surface and a rear surface, a first wall and a second wall extending from the rear surface of the cover member to be opposite each other, and the first wall and the second wall being configured to have a vehicular utility part therebetween, an extended wall including a first extended portion, a second extended portion, and a connection portion connecting the first extended portion and the second extended portion, the extended wall being configured to have an exposed portion of the vehicular utility part inside the extended wall, the exposed portion disposed outside the cover member, the first extended portion extending from an extended distal end portion of the first wall to an outside of the cover member and parallel to the cover member, the second extended portion extending from an extended distal end portion of the second wall to the outside of the cover member and parallel to the first extended portion, and the connection portion connecting end portions of the first extended portion and the second extended portion that are outside the cover member, and the vehicular interior part includes a plate member having an insertion hole in which the vehicular utility part mounting member is inserted and an insertion hole edge around the insertion hole, and a receiving member having a mounting hole in which the vehicular utility part mounting member is mounted, the receiving member being arranged on a vehicular exterior side with respect to the plate member such that the mounting hole overlaps the insertion hole. The extended wall of the vehicular utility part mounting member mounted in the mounted hole through the insertion hole is in contact with the receiving member, and the exposed portion of the vehicular utility part arranged in a space inside the extended wall overlaps an insertion hole edge of the insertion hole of the vehicular interior part.

DETAILED DESCRIPTION OF EMBODIMENT

Figure 1:
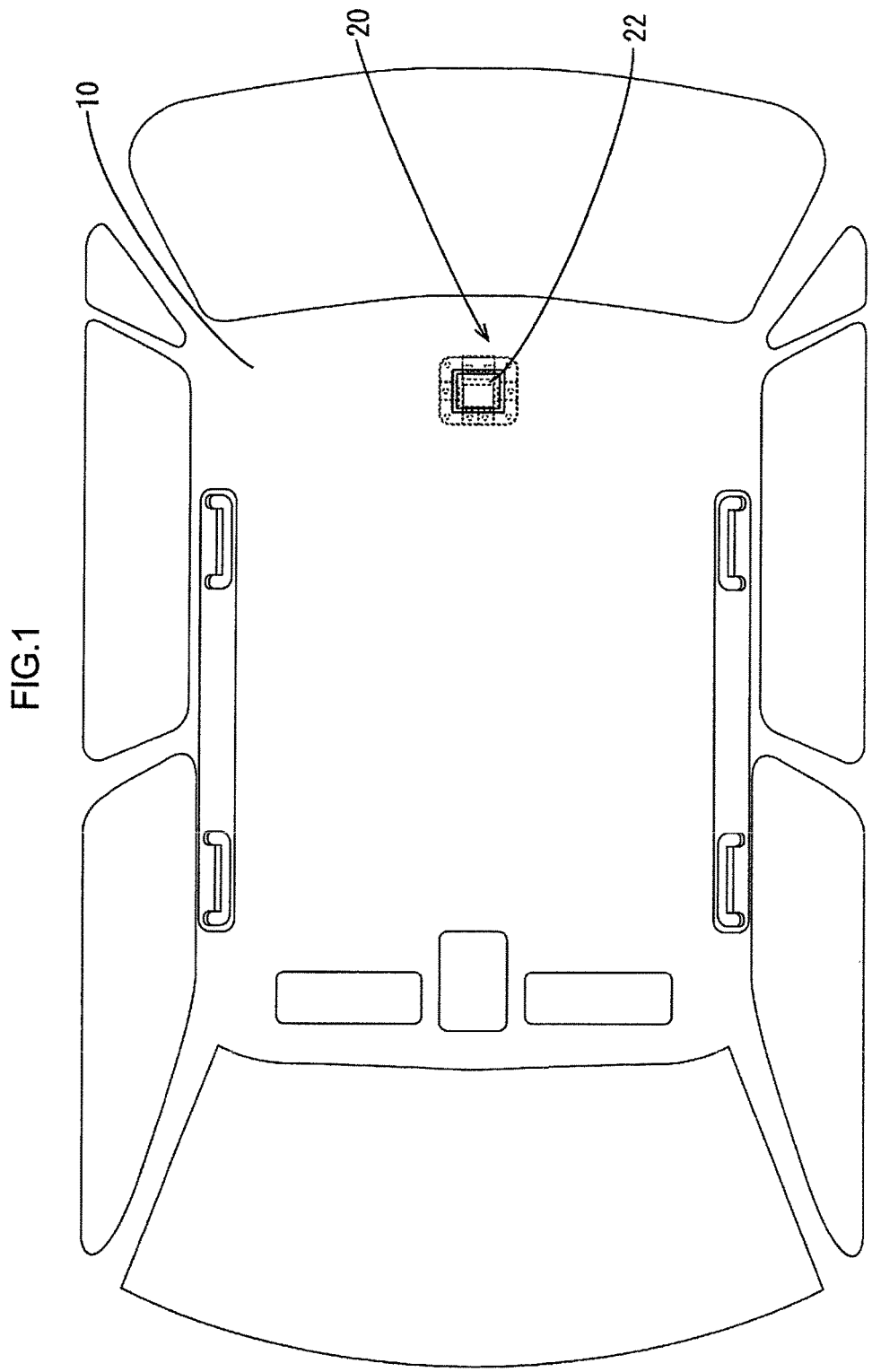
FIG. 1 is a plan view of a ceiling member including a mounting assembly according to one embodiment of the present technology.

One embodiment of the present technology will be described with reference to FIGS. 1 to 8. In this embodiment, a mounting assembly 100 of a mounting member 20 (a vehicular utility part mounting member) and a ceiling member 10 (a vehicular interior part) will be described. A microphone 12, which is a vehicular utility part, is arranged in the mounting member 20. As illustrated in FIG. 1, the mounting member 20 including the microphone 12 therein is mounted in the ceiling member 10 of a vehicle and near a head of a passenger who is seated in a rear seat.

A configuration of the mounting member 20 where the microphone 12 is arranged will be described with reference to FIGS. 4 and 5. The mounting member 20 includes a cover member 22 that is a flat plate having a front surface (a vehicular interior side surface) and a rear surface (a vehicular exterior side surface), walls extending from the rear surface of the cover member 22, an extended wall 30 extending from the walls to an outside of the cover member 22 and parallel to the cover member 22.

Figure 4:
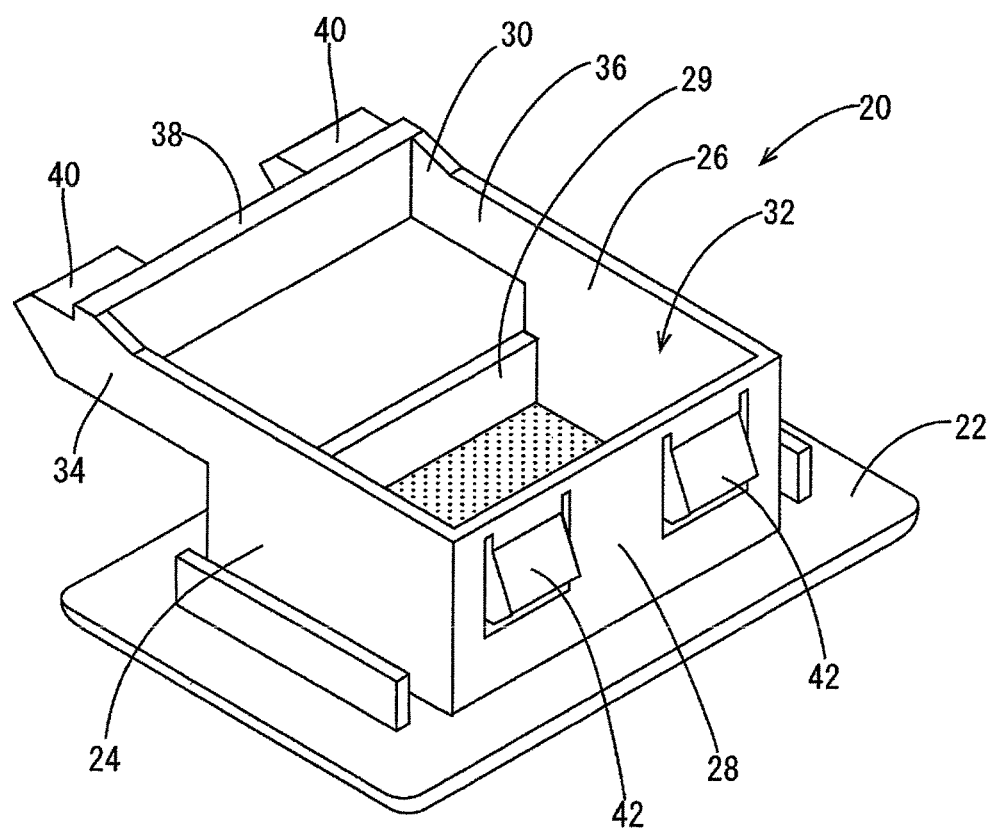
FIG. 4 is a perspective view of the mounting member seen from a housing portion side.

As illustrated in FIG. 4, the walls include a first wall 24 and a second wall 26 that are opposite each other, and a third wall 28 and a fourth wall 29 (a base wall) that are opposite each other. The microphone 12 is arranged between the first wall 24 and the second wall 26. The third wall 28 and the fourth wall 29 are adjacent to the first wall 24 and the second wall 26, respectively, and each of the third wall 28 and the fourth wall 29 extends and connects the first wall 24 and the second wall 26. The fourth wall 29 has a height dimension from the rear surface of the cover member 22 that is smaller than a height dimension of the first wall 24, the second wall 26, and the third wall 28.

The first wall 24, the second wall 26, the third wall 28, and the extended wall 30 form a housing portion 32 therein and the microphone 12 is arranged in the housing portion 32.

The extended wall 30 includes a first extended portion 34, a second extended portion 36, and a connection portion 38. The first extended portion 34 and the second extended portion 36 extend from distal end portions of the respective first wall 24 and the second wall 26. As illustrated in FIGS. 4 and 5, the connection portion 38 connects the first extended portion 34 and the second extended portion 36 at extended distal end portions thereof and is positioned outside the cover member 22. Specifically, the first extended portion 34 and the second extended portion 36 extend from the distal end portions of the first wall 24 and the second wall 26, respectively, to the outside of the cover member 22 and parallel to the cover member 22. The first extended portion 34 and the second extended portion 36 are plates that are parallel to each other. As illustrated in FIGS. 4 to 6, the first extended portion 34 and the second extended portion 36 extend to the outside of the cover member 22 and project outward from an edge of the cover member 22. The connection portion 38 is disposed outside the cover member 22 and is disposed not to overlap the cover member 22.

Figure 5:
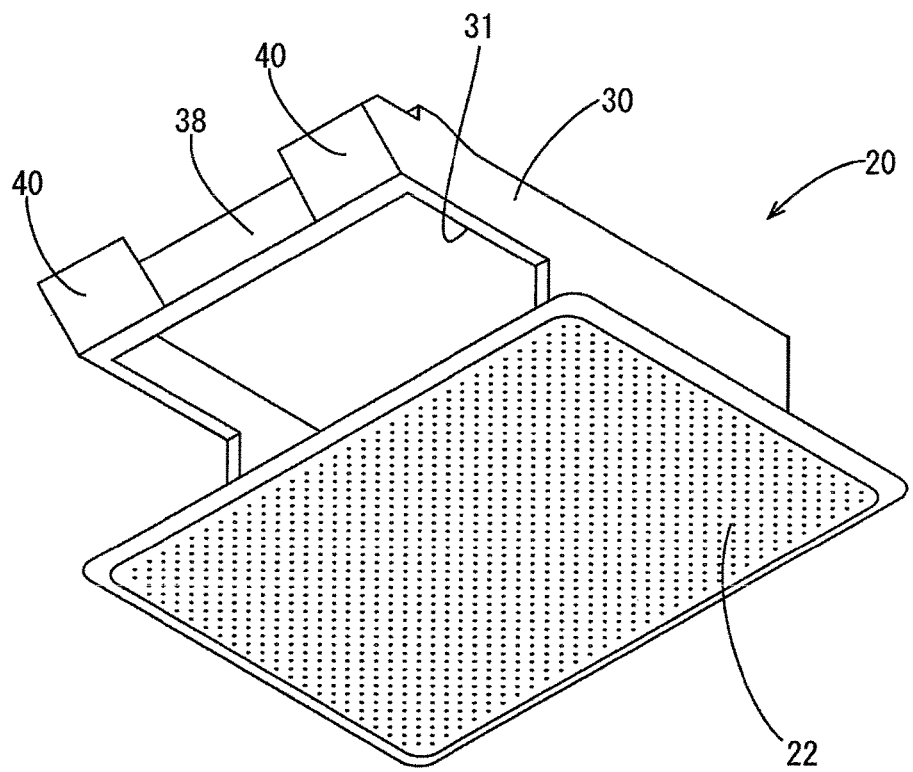
FIG. 5 is a perspective view of the mounting member seen from a cover member side.
Figure 6:
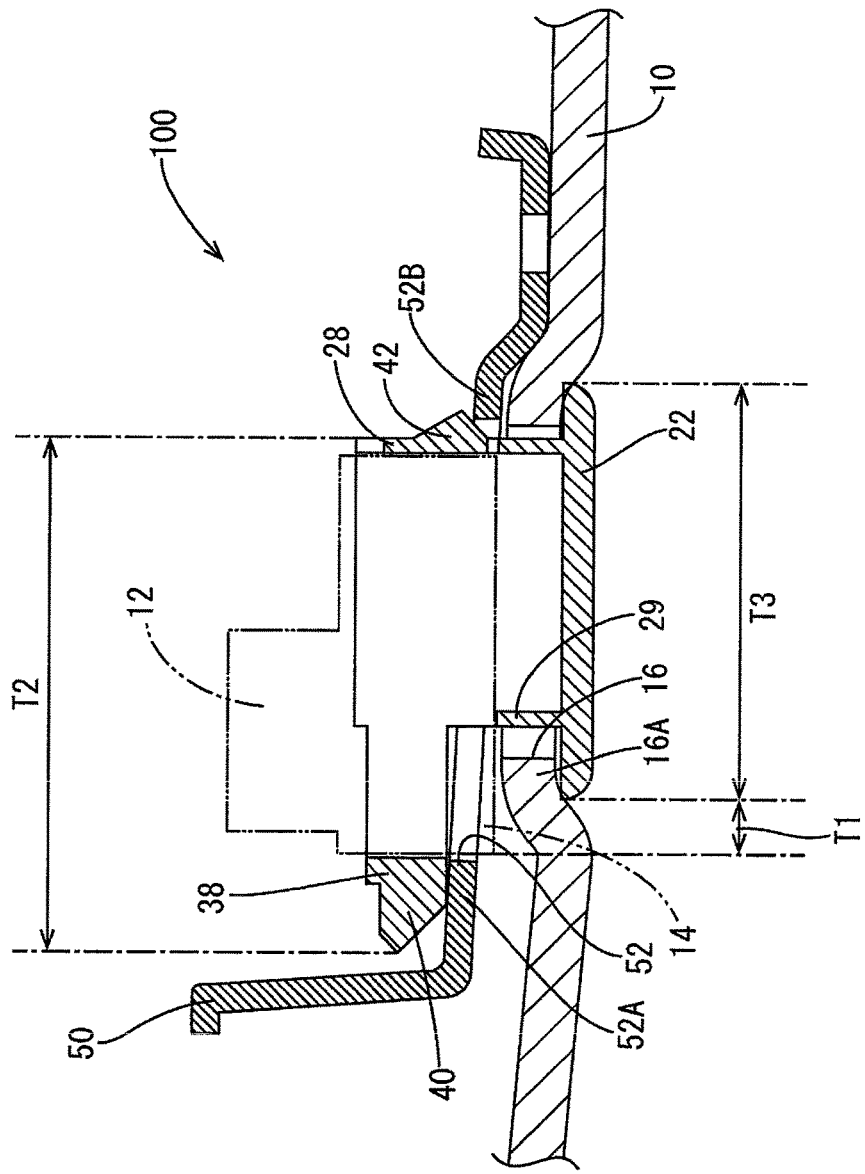
FIG. 6 is a cross-sectional view taken along line VI-VI in FIG. 2 and illustrating the mounting assembly according to the one embodiment.

As illustrated in FIGS. 4 and 5, the extended wall 30 extends from the distal end portions of the first wall 25 and the second wall 26 and therefore, the extended wall 30 is away from the rear surface of the cover member 22. The extended wall 30 extends outside the cover member 22 and projects outward from the edge of the cover member 22. As illustrated in FIG. 5, the extended wall 30 has a receiving hole 31 inside the extended wall 30. The first contact portion 52A, which is the mounting hole edge portion of a receiving member 50, and the insertion hole edge 16A of the ceiling member 10 are inserted in the receiving hole 31 when the mounting member 20 is mounted in the ceiling member 10. The exposed portion 14 of the microphone 12 is arranged in the receiving hole 31.

As illustrated in FIGS. 4 to 6, the connection portion 38 includes two projections 40 projecting from an outer surface of the connection portion 38 that is an opposite surface from an inner surface facing the housing portion 32. The projections 40 project in a direction in which the first extended portion 34 and the second extended portion 36 extend. The projections 40 are molded with resin integrally with the connection portion 38. The third wall 28 includes two stopper projections 42 on an outer surface thereof that is an opposite surface from an inner surface facing the housing portion 32. The stopper projections 42 project outwardly from the outer surface of the third wall 28.

As illustrated in FIG. 6, the ceiling member 10 has an insertion through hole 16 where the mounting member 20 is inserted and the receiving member 50 has a mounting hole 52. The receiving member 50 is disposed on a rear surface side of the ceiling member 10 at a position of the insertion through hole 16. The receiving member 50 is arranged such that the mounting hole 52 overlaps the insertion through hole 16 and the mounting member 20 is mounted in the insertion through hole 16 and the mounting hole 52. The insertion through hole 16 is slightly smaller than the cover member 22 and the microphone 12 can be just fit in the mounting hole 52. The insertion through hole 16 is smaller than the mounting hole 52. Namely, the insertion through hole 16 is quite smaller than the microphone 12.

Figure 8:
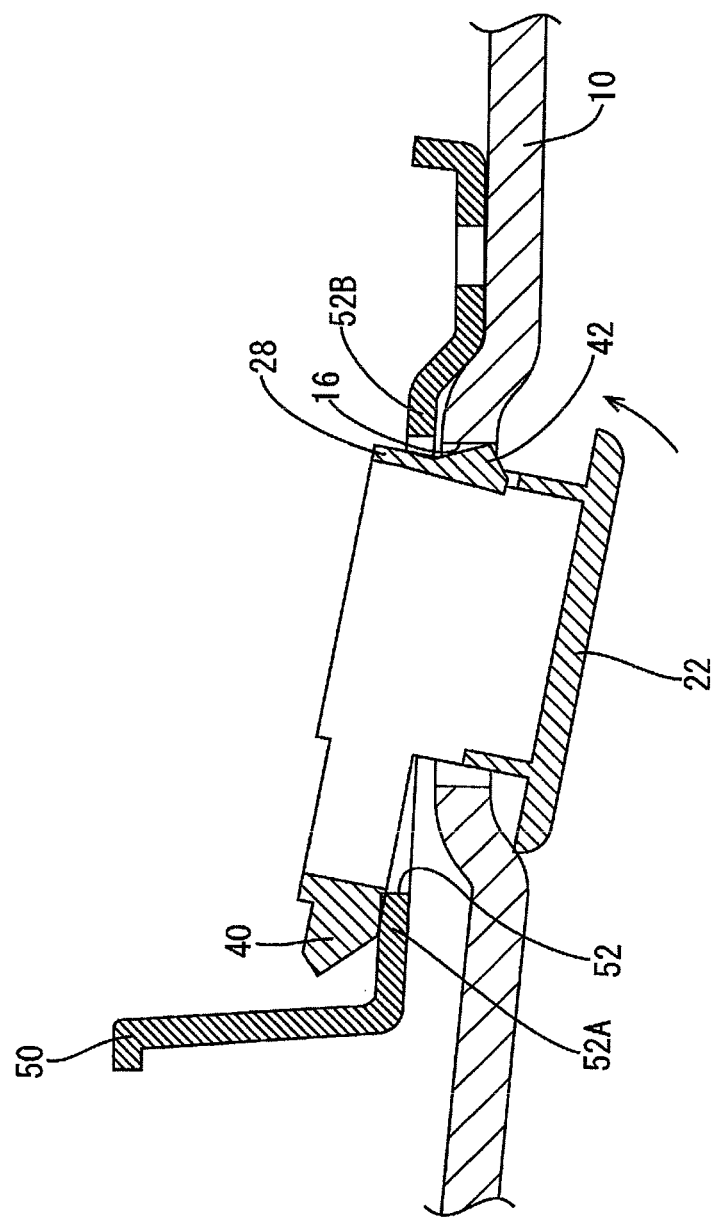
FIG. 8 is a cross-sectional view illustrating the mounting member that is being inserted in a mounting hole.

Next, the mounting assembly 100 of the mounting member 20 and the ceiling member 10 will be described. When mounting the mounting member 20 in the receiving member 50 of the ceiling member 10, as illustrated in FIG. 8, the mounting member 20 is inserted through the insertion through hole 16 of the ceiling member 10 and into the mounting hole 52 of the receiving member 50. The extended wall 30 of the mounting member 20 is first inserted through the insertion through hole 16 and the mounting hole 52 obliquely from the front surface side o the ceiling member 10. The projections 40 of the connection portion 38 are put on (contacted with) a first contact portion 52A of the hole edge portion of the mounting hole 52 and the mounting member 20 is moved around the contact portion of the projections 40 and the first contact portion 52A. Then, the third wall 28 is inserted through the insertion through hole 16 into the mounting hole 52 of the receiving member 50.

The stopper projections 42 are pressed by insertion hole edge portion of the insertion through hole 16 and a second contact portion 52B of a hole edge portion of the mounting hole 52 and the third wall 28 is elastically deformed to be tilted toward the housing portion 32 such that the third wall 28 is inserted through the insertion through hole 16 into the mounting hole 52. The third wall 28 elastically recovers its original shape after the third wall 28 is inserted into the mounting hole 52. Then, the stopper projections 42 come into contact with the second contact portion 52B of the mounting hole 52 and are stopped by the second contact portion 52B. Accordingly, the mounting member 20 is less likely to drop from the mounting hole 52.

Figure 2:
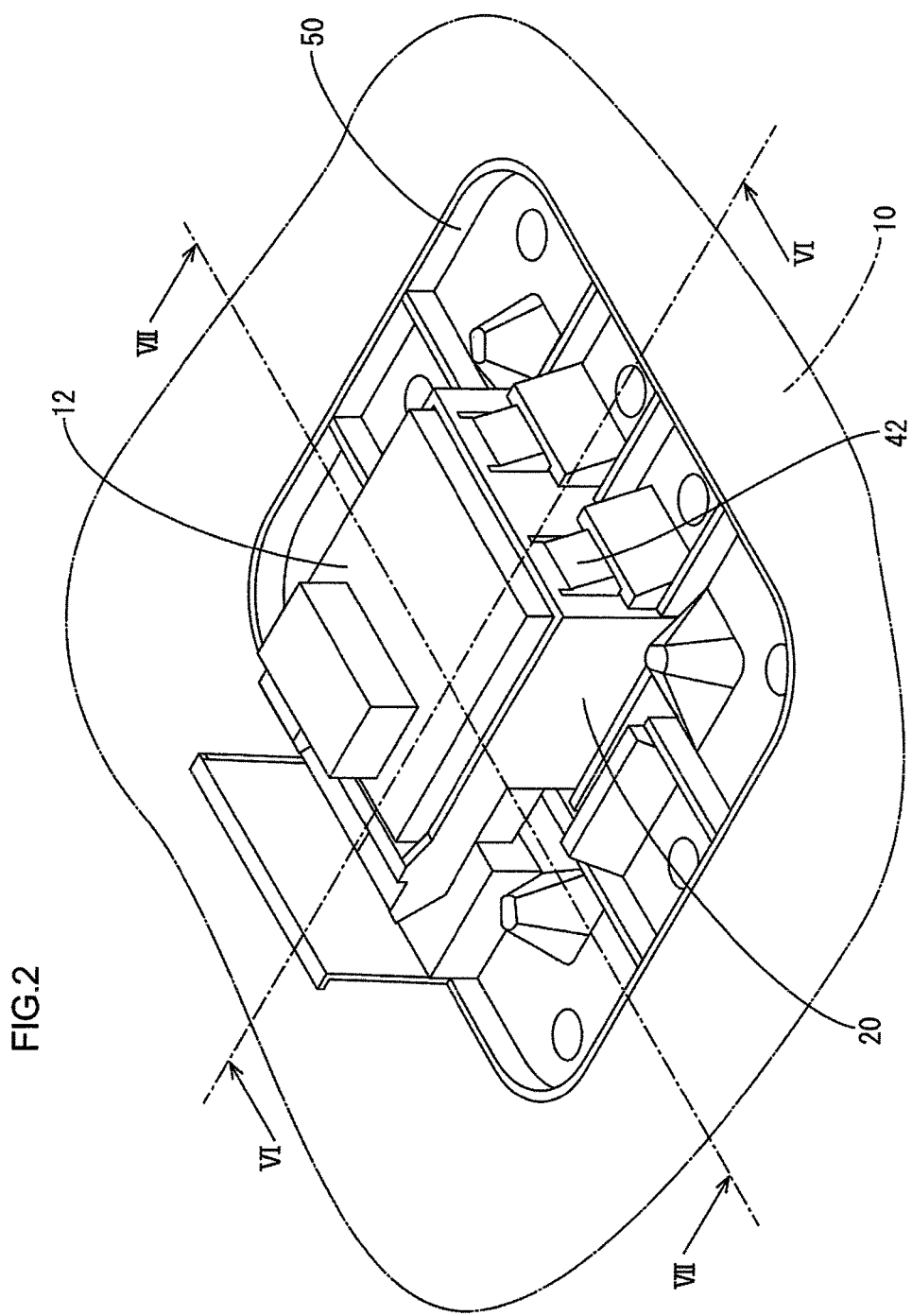
FIG. 2 is a perspective view illustrating a receiving member where a mounting member including a microphone is mounted.
Figure 3:
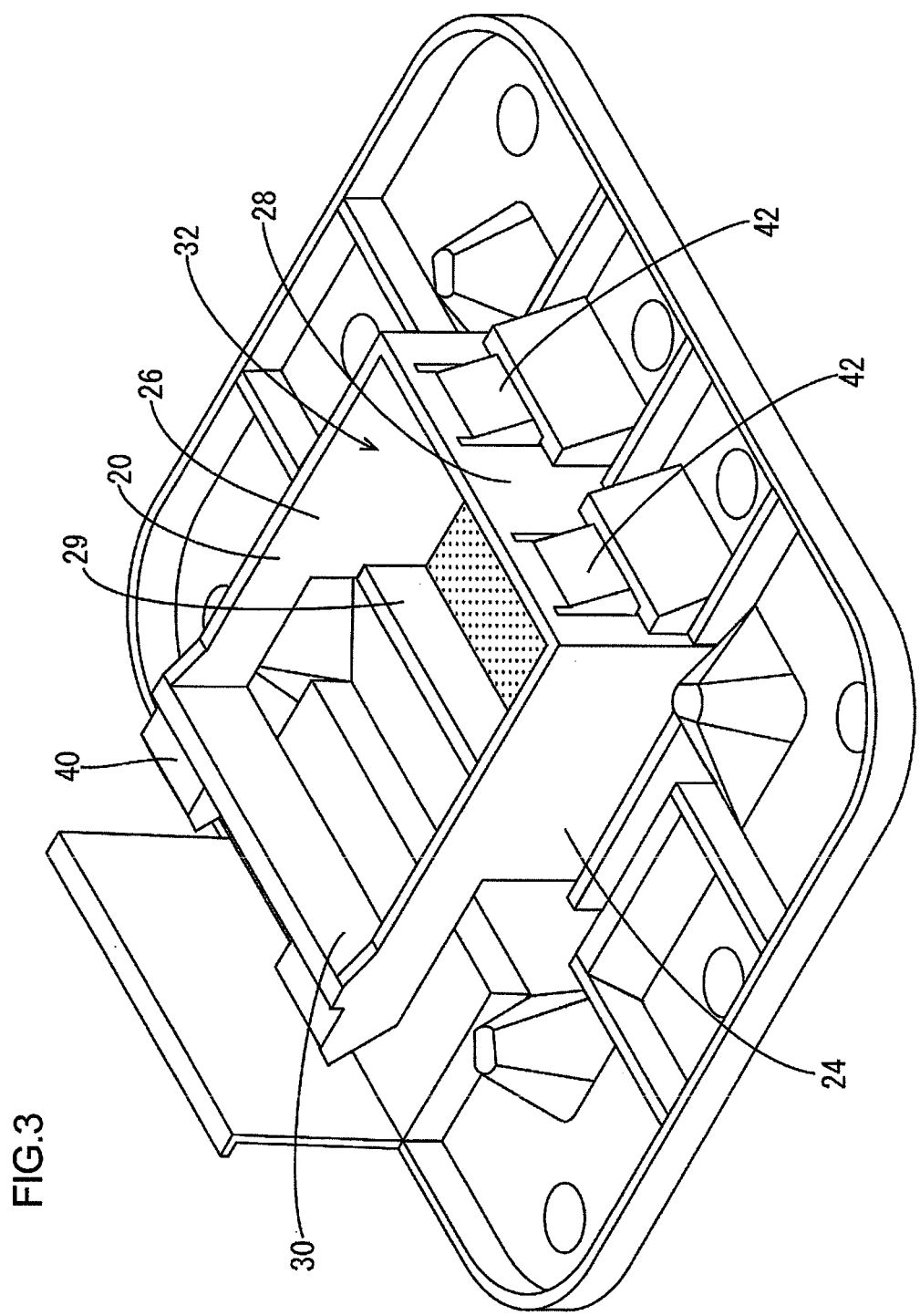
FIG. 3 is a perspective view illustrating the receiving member where the mounting member with no microphone is mounted.
Figure 7:
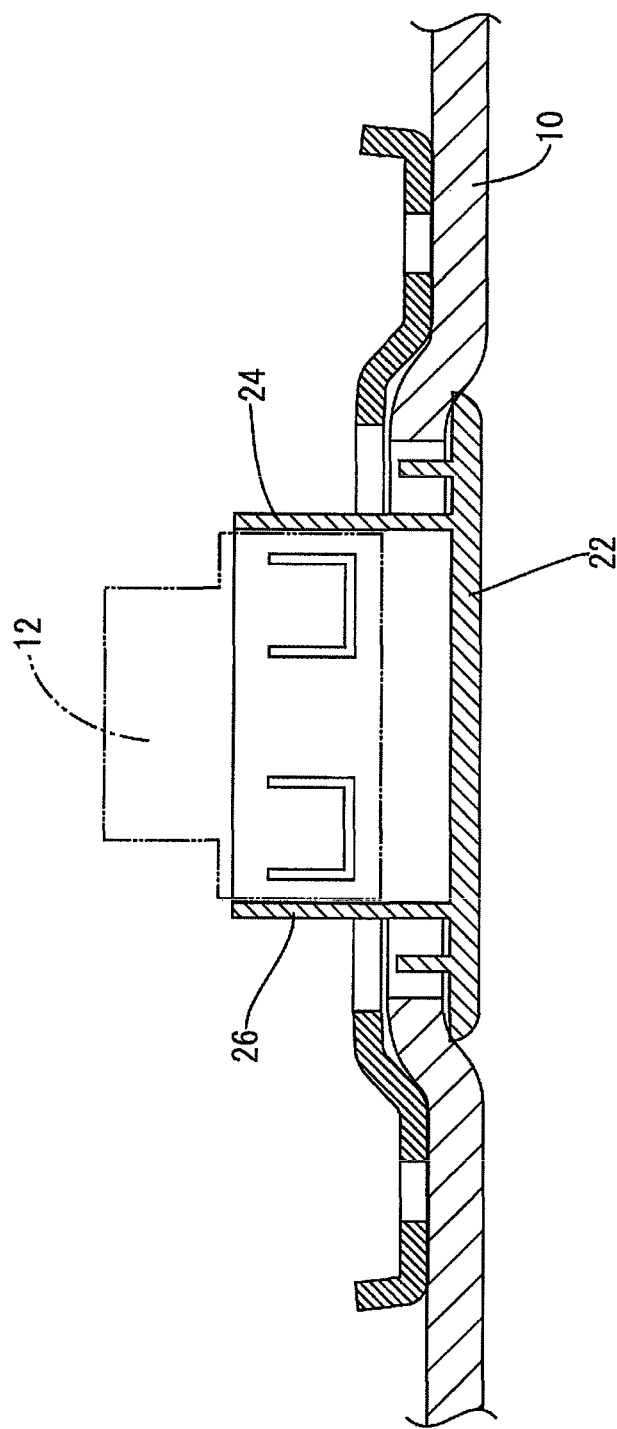
FIG. 7 is a cross-sectional view taken along line VII-VII in FIG. 2 and illustrating the mounting assembly according to the one embodiment.

After the mounting member 20 is mounted in the mounting hole 52 as illustrated in FIG. 3, the microphone 12 is arranged in the housing portion 32. As illustrated in FIGS. 2, 6, and 7, the microphone 12 that is arranged in the housing portion 32 is surrounded and held by the first wall 24, the second wall 26, the third wall 28, and the extended wall 30. The third wall 28 may not be elastically deformed since the microphone 12 is arranged inside the extended wall 30 and on an inner surface side of the third wall 28. Therefore, the stopper projections 42 are less likely to be released from the second contact portion 52B.

As illustrated in FIGS. 3 and 4, the fourth wall 29 is disposed within the housing portion 32 and is shorter than the first wall 24, the second wall 26, and the third wall 28. Therefore, as illustrated in FIG. 6, the microphone 12 is disposed on a top end surface of the fourth wall 29 within the housing portion 32 that is surrounded by the first wall 24, the second wall 26, the third wall 28, and the extended wall 30. The microphone 12 is away from the rear surface of the cover member 22 by the height dimension of the fourth wall 29.

As illustrated in FIG. 6, the microphone 12 that is arranged within the housing portion 32 includes an exposed portion 14 surrounded by the extended wall 30 and the exposed portion 14 is outside the cover member 22 and inside the extended wall 30. The exposed portion 14 of the microphone 12 is uncovered with the cover member 22 and overlaps an insertion hole edge 16A of the insertion through hole 16 in the ceiling member 10.

According to such a configuration, a space is provided between the microphone 12 and the rear surface of the cover member 22. The insertion hole edge 16A of the insertion through hole 16 of the ceiling member 10 is arranged in the space such that the exposed portion 14 of the microphone 12 and the cover member 22 sandwich the insertion hole edge 16A therebetween.

Next, operations and effects of the mounting assembly 100 of the mounting member 20 and the ceiling member 10 will be described.

As illustrated in FIG. 6, when the mounting member 20 is mounted in the mounting hole 52, the exposed portion 14 of the microphone 12 is projected from an outer edge of the cover member 22 by a projection amount T1. The microphone 12 and the insertion hoe edge 16A of the insertion through hole 16 of the ceiling member 10 are overlapped with each other by the projection amount T1. With such a configuration, the insertion through hole 16 of the ceiling member 10 is smaller by an overlapping amount that is the projection amount T1 compared to a conventional configuration. Accordingly, the cover member 22 is smaller by the overlapping amount that is the projection amount T1 of the exposed portion 14.

The size (a dimension T2) of the mounting member 20 is determined such that the microphone 12 can be arranged therein and the size (a dimension T3) of the cover member 22 is reduced. The dimension T3 of the cover member 22 is smaller than the dimension T2 of the mounting member 20. The size of the insertion through hole 16 can be smaller. According to such a configuration, the cover member 22 that can be seen from the vehicular interior side is smaller and this improves design of the vehicular interior. The mounting member 20 with the small-sized cover member 22 can be freely mounted in various portions.

As described before, the mounting member 20 is configured such that the exposed portion 14 of the microphone 12 that is arranged within the extended wall 30 overlaps the ceiling member 10 by the projection amount T1. The microphone 12 is arranged such that the edge portion of the microphone 12 on the exposed portion 14 side and the edge portion of the cover member 22 opposite the edge portion of the microphone 12 sandwich the insertion hoe edge 16A of the insertion through hole 16. With such a configuration having the small-sized cover member 22, the space within the housing portion 32 is effectively provided such that the microphone 12 can be arranged in the space.

In this embodiment, when the mounting member 20 is mounted in the ceiling member 10, the extended wall 30 side end portion of the mounting member 20 is inserted first obliquely through the insertion through hole 16 of the ceiling member 10 into the mounting hole 52 of the receiving member 50, as illustrated in FIG. 8. The projections 40 are contacted with the first contact portion 52A of the mounting hole 52 and the mounting member 20 is rotated around the contact portion such that the third wall 28 is inserted in the mounting hole 52. Thus, the mounting member 20 is mounted in the mounting hole 52. According to such a mounting method, the mounting member 20 having the dimension T2 greater than the dimension of the insertion through hole 16 can be mounted stably and surely in the receiving member 50 through the insertion through hole 16.

OTHER EMBODIMENTS

The present technology is not limited to the description as described above with reference to the drawings. For example, the present technology may include following embodiments.

In the above embodiment, the two projections 40 and the two stopper projections 42 are included. However, the number of the projections 40, 42 may be one, three or more than three.

In the above embodiment, the third wall 28 opposite the connection portion 38 includes the stopper projections 42. However, the first wall 24 and the second wall 26 that are opposite each other may include the stopper projections 42 on outer surfaces thereof.

In the above embodiment, the microphone 12 is arranged in the mounting member 20 as the vehicular utility part. However, a lighting device or a speaker may be arranged in the mounting member 20.

In the above embodiment, the ceiling member 10 is used as the vehicular interior part. However, other interior parts such as a door trim may be used.

The invention claimed is:

1. A mounting assembly of a vehicular utility part mounting member and a vehicular interior part, the vehicular utility part mounting member comprising:
    a cover member having a front surface and a rear surface;
    a first wall and a second wall extending from the rear surface of the cover member to be opposite each other, and the first wall and the second wall being configured to have a vehicular utility part therebetween;
    an extended wall including a first extended portion, a second extended portion, and a connection portion connecting the first extended portion and the second extended portion, the extended wall being configured to have an exposed portion of the vehicular utility part inside the extended wall, the exposed portion disposed outside the cover member,
        the first extended portion extending from an extended distal end portion of the first wall to an outside of the cover member and parallel to the cover member,
        the second extended portion extending from an extended distal end portion of the second wall to the outside of the cover member and parallel to the first extended portion, and
        the connection portion connecting end portions of the first extended portion and the second extended portion that are outside the cover member, and
    the vehicular interior part comprising:
    a plate member having an insertion hole in which the vehicular utility part mounting member is inserted and an insertion hole edge around the insertion hole, and
    a receiving member having a mounting hole in which the vehicular utility part mounting member is mounted, the receiving member being arranged on a vehicular exterior side with respect to the plate member such that the mounting hole overlaps the insertion hole, wherein
    the extended wall of the vehicular utility part mounting member mounted in the mounted hole through the insertion hole is in contact with the receiving member, and
    the exposed portion of the vehicular utility part arranged in a space inside the extended wall overlaps an insertion hole edge of the insertion hole of the vehicular interior part.

2. The mounting assembly according to claim 1, wherein the connection portion includes a projection projecting outward and the mounting hole has a mounting hole edge around the mounting hole,
    the connection portion is inserted in the mounting hole through the insertion hole and the projection of the connection portion is contacted with the mounting hole edge, and the vehicular utility part mounting member is mounted in the vehicular interior part according to rotation of the vehicular utility part mounting member around a contact portion of the projection and the mounting hole edge.

3. The mounting assembly according to claim 2, wherein the vehicular utility part mounting member further includes:
a third wall that is adjacent to the first wall and the second wall and extends from the rear surface of the cover member to be opposite the connection portion; and
a housing portion including the first wall, the second wall, the third wall, and the extended wall and having a housing space surrounded by the first wall, the second wall, the third wall, and the extended wall, and the housing portion being configured to have the vehicular utility part in the housing space, wherein
the third wall includes an inner surface facing the housing space and an outer surface that is opposite from the inner surface, and includes a stopper projection on the outer surface, and
the third wall is inserted in the mounting hole through the insertion hole while being elastically deformed and the stopper projection is contacted with the mounting hole edge of the mounting hole according to the rotation of the vehicular utility part mounting member.

4. The mounting assembly according to claim 1, wherein the vehicular utility part mounting member further includes a base wall (29) that is elongated from the first wall to the second wall and extends from the rear surface of the cover member while having a height dimension from the rear surface that is smaller than a height dimension of the first wall and the second wall, and
the vehicular utility part is arranged on an extended distal end portion of the base wall within the housing space.

5. The mounting assembly according to claim 1, wherein the cover member and the exposed portion sandwich the insertion hole edge of the insertion hole of the vehicular interior part.

6. The mounting assembly according to claim 1, wherein the vehicular utility part mounting member further comprising a receiving through hole defined by the extended wall and in which the insertion hole edge and a part of the vehicular utility part are disposed and overlapped with each other and that is communicated with the space inside the extended wall.

7. The mounting assembly according to claim 1, wherein the insertion hole is smaller than the mounting hole and smaller than the vehicular utility part.

8. The mounting assembly according to claim 1, wherein the receiving member has a mounting hole edge around the mounting hole, and the extended wall and the cover member sandwich the mounting hole edge and the insertion hole edge therebetween.

9. The mounting assembly according to claim 8, wherein
the connection portion is contacted with the mounting hole edge and the cover member is contacted with the insertion hole edge, and
the cover member and the connection portion sandwich the mounting hole edge and the insertion hole edge therebetween.

10. The mounting assembly according to claim 9, wherein the vehicular utility part mounting member further includes:
a third wall that is adjacent to the first wall and the second wall and extends from the rear surface of the cover member to be opposite the connection portion; and
a housing portion including the first wall, the second wall, the third wall, and the extended wall, and the housing portion having a housing space surrounded by the first wall, the second wall, and the extended wall and being configured to have the vehicular utility part in the housing space, wherein
the third wall includes an inner surface facing the housing space and an outer surface that is opposite from the inner surface, and includes a stopper projection on the outer surface, and
the stopper projection is contacted with the mounting hole edge, and the stopper projection and the cover member sandwich the mounting hole edge and the insertion hole edge therebetween.

11. The mounting assembly according to claim 4, wherein the vehicular utility part that is within the housing space is spaced from the cover member.

12. The mounting assembly according to claim 1, wherein
the front surface of the cover member faces a vehicular interior side and the rear surface faces a vehicular exterior side, and
the receiving member is disposed on the vehicular exterior side with respect to the plate member, and the cover member is disposed on the vehicular interior side with respect to the plate member.

* * * * *